(No Model.)
A. S. BULLOCK.
POTATO DIGGER.
No. 600,403.                    Patented Mar. 8, 1898.
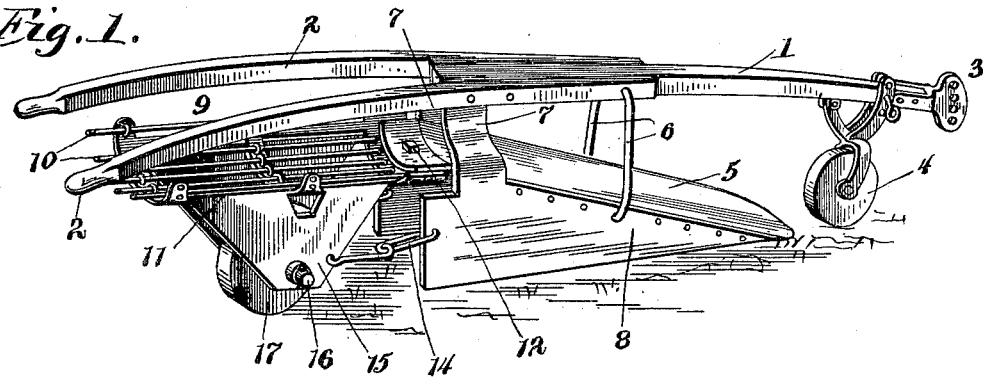
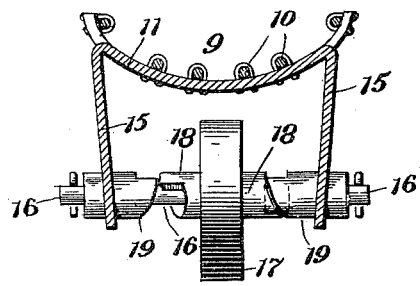
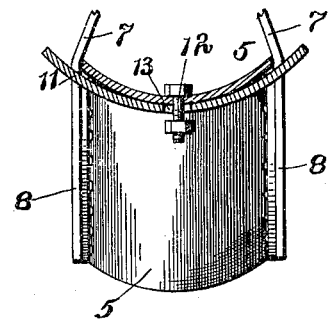
Inventor
Arthur S. Bullock,
Witnesses
By his Attorneys,

UNITED STATES PATENT OFFICE.

ARTHUR S. BULLOCK, OF POMONA, MICHIGAN.

POTATO-DIGGER.

SPECIFICATION forming part of Letters Patent No. 600,403, dated March 8, 1898.

Application filed May 25, 1897. Serial No. 638,108. (No model.)

*To all whom it may concern:*

Be it known that I, ARTHUR S. BULLOCK, a citizen of the United States, residing at Pomona, in the county of Manistee and State of Michigan, have invented a new and useful Potato-Digger, of which the following is a specification.

My invention relates to potato-diggers, and has for its object to provide a simple and efficient construction and arrangement of parts including a separator or shaker provided with actuating devices whereby a transverse vibratory motion is imparted thereto.

Further objects and advantages of this invention will appear in the following description, and the novel features thereof will be particularly pointed out in the appended claims.

In the drawings, Figure 1 is a perspective view of a potato-digger constructed in accordance with my invention. Fig. 2 is a transverse vertical section in the plane of the separator-supporting wheel. Fig. 3 is a transverse section taken in the plane of the connection between the separator and the plow or shovel.

Similar numerals of reference indicate corresponding parts in all the figures of the drawings.

1 designates a draft-beam to which at its rear end are attached handles 2 and which at its front end is provided with a clevis 3 and colter-wheel 4, of which the construction is similar to that used in connection with an ordinary plow.

The plow or shovel 5 is transversely concaved and is supported from the beam by means of front and rear hangers 6 and 7, the rear hangers preferably consisting of extensions of side plates or runners 8, which are arranged at the lateral edges of the plow or shovel and traverse the soil. Obviously the pitch of the plow or shovel or the depth at which the front end thereof operates is controlled by the adjustment of the colter-wheel.

Arranged in rear of the plow or shovel, with its front end extending beneath the rear edge of the same, is a separator 9, having an upwardly-concaved basket inclined downwardly toward its rear end and barred, as shown at 10, or otherwise reticulated to allow earth loosened from the potatoes to drop through, while the potatoes are discharged upon the surface of the ground at the rear end of the separator. The connection between the frame 11 of the separator and the rear end of the plow or shovel is formed by means of a bolt 12, depending from the rear end of the plow or shovel and engaging a transverse slot 13 in the frame of the separator, whereby the separator is free to vibrate laterally, but is held from longitudinal displacement. The contiguous overlapping portions of the shovel and separator are approximately horizontal, and link connections 14 extend from the rear ends of the runners of the shovel to the depending side plates 15 of the separator. Mounted in said side plates is a spindle 16 of an actuating-wheel 17, the hubs of said wheel being provided with cams 18, which coöperate with fixed cams 19, secured to the inner surfaces of said side plates, the cams at opposite sides of the wheel being oppositely disposed, whereby as the wheel is rotated in contact with the surface of the soil a lateral vibratory motion is imparted to the separator to loosen the soil from the articles deposited in the separator by the shovel. The slotted connection between the separator and the shovel, formed by the bolt and engaged slot, and the loose-link connection between the side plates of the separator and the runners of the plow allow this vibratory movement without adding materially to the draft of the machine.

Inasmuch as the separator-supporting wheel 17 traverses the surface of the soil the unevennesses of the latter cause a vertical vibratory movement of the separator, while the coöperating fixed and movable cams impart the necessary lateral vibratory movement. Hence the separator receives a combined vertical and lateral motion, which effectually separates the soil from the potatoes or other objects without bruising or otherwise injuring the latter.

Various changes in the form, proportion, and the minor details of construction may be resorted to without departing from the spirit or sacrificing any of the advantages of this invention.

Having described my invention, what I claim is—

1. In a potato-digger, the combination with a plow or shovel, of a separator arranged contiguous to the discharge end of the plow or shovel to receive the contents thereof, and loosely connected with the plow for draft thereby, a supporting-wheel mounted upon the separator to peripherally traverse the surface of the soil, and coöperating means, respectively, on said supporting-wheel and separator, for imparting a lateral vibratory movement to the latter, substantially as specified.

2. In a potato-digger, the combination with a plow or shovel, of a separator having a slotted connection at its front end with the contiguous extremity of the plow or shovel to allow lateral vibration, side draft-links, of flexible construction, connecting the separator with the plow to prevent deflection of the separator from the line of the plow or shovel, and means for imparting a lateral vibratory movement to the separator, substantially as specified.

3. In a potato-digger, the combination with a plow or shovel, of a separator arranged to receive the discharge from the plow or shovel, an actuating-wheel mounted upon a transverse shaft carried by the separator to support the latter, and coöperating pairs of movable and fixed cams respectively on the wheel and separator for imparting a lateral vibratory movement to the latter, substantially as specified.

4. In a potato-digger, the combination of an upwardly and rearwardly inclined plow or shovel provided with pendent side runners and having its rear end upwardly concaved, a separator having an upwardly-concaved front end extending under the said rear end of the plow or shovel and provided with a transverse slot, a bolt carried by the rear end of the plow fitting loosely in the slot of the separator to allow vibratory movement of the latter, side plates 15 depending from the separator, draft-links loosely connecting said side plates with the runners of the plow, a transverse shaft connecting said side plates, fixed cams concentric with the shaft contiguous to the inner surfaces of the side plates, and a separator-supporting wheel loosely mounted upon said shaft between said fixed cams to traverse the soil, and provided with movable cams for coöperation therewith, whereby a combined vertical and lateral vibratory motion is imparted to the separator, substantially as specified.

In testimony that I claim the foregoing as my own I have hereto affixed my signature in the presence of two witnesses.

ARTHUR S. BULLOCK.

Witnesses:
FRED CRAWFORD,
ELIZABETH CHUBB.